UNITED STATES PATENT OFFICE.

CHARLES M. MARTIN, OF NEW YORK, N. Y., ASSIGNOR TO THE WASHINGTON FIRE EXTINGUISHER MANUFACTURING COMPANY, OF WASHINGTON, DISTRICT OF COLUMBIA.

GENERATING GASES IN FIRE-EXTINGUISHERS.

SPECIFICATION forming part of Letters Patent No. 246,894, dated September 13, 1881.

Application filed February 19, 1881. (No specimens.)

*To all whom it may concern:*

Be it known that I, CHARLES M. MARTIN, of the city and State of New York, have invented a new and Improved Method of Generating Gases in Fire-Extinguishers; and I hereby declare the following to be a full, clear, and exact description thereof.

The object of my invention is to produce a quick and certain generation of a large volume of gases which are non-supporters of combustion, and to be projected, commingled with water, upon the fire to be subdued.

Any of the well-known forms of extinguishers may be used in carrying out my invention, provided such extinguisher contains within its body a supplemental vessel to contain one portion of the chemicals separated from the other portion.

My invention consists in a method of generating the extinguishing-gases by precipitating a mixture of sulphate of ammonia and sulphate of alumina into a solution of bicarbonate of soda in water, as hereinafter described.

In order that those skilled in the art may make and use my invention, I will proceed to describe the manner in which I have carried it out.

I take any desired construction of extinguisher having a holding capacity of seven gallons. Into the main cylinder I put six and one-half gallons of water and dissolve in it twenty-four ounces of bicarbonate of soda. In the interior separate chamber, in the upper part of the main cylinder, I place, in a dry condition, twelve ounces of sulphate of ammonia (crude) and eighteen ounces of sulphate of alumina, previously thoroughly mixed. When the gas is to be generated the interior vessel containing the dry chemicals is crushed, overturned, or opened by any of the well-known mechanical contrivances now in use, and the dry chemicals—viz., the sulphate of ammonia and the sulphate of alumina—are precipitated or thrown into the solution in the main body of the extinguisher. Certain chemical reactions take place instantly, which evolve a large volume of gases which will not support combustion. The water heavily charged with these gases and any residual alkaline salt, is projected through a hose or pipe upon the fire to be extinguished.

The proportions named of the several chemicals and water I have found by experiment to give the best results; but it is evident that the proportions may be varied somewhat without departing from the spirit of my invention.

Experiment teaches me that the effect of the compound as an extinguishing agent is greatly enhanced by the evolution of a larger volume of gases when the chemically-charged water is thrown upon the material in flames. I have failed to identify the exact character of these gases; but experiments indicate that they are ammonical gases and free nitrogen.

I am aware that the ingredients named in this application are not *per se* novel for gas-producing purposes in fire-extinguishers, and therefore I make no broad claim to either of them.

Having thus described my invention, what I claim as new, and desire to secure by Letters Patent, is—

The improved method herein described of generating gases in fire-extinguishers, consisting, essentially, in throwing a dry mixture of sulphate of ammonia and sulphate of alumina into a solution of bicarbonate of soda, previously kept apart from the action of said sulphates, within the body of the extinguisher, as set forth.

CHAS. M. MARTIN.

Witnesses:
R. K. EVANS,
JNO. L. CONDRON.